(12) United States Patent
Ginggen et al.

(10) Patent No.: US 7,917,812 B2  
(45) Date of Patent: Mar. 29, 2011

(54) RESETTING OF MULTIPLE PROCESSORS IN AN ELECTRONIC DEVICE

(75) Inventors: Alec Ginggen, Neuchâtel (CH); Rocco Crivelli, Bellinzona (CH)

(73) Assignee: Codman Neuro Sciences Sárl, LeLode (CH)

( * ) Notice: Subject to any disclaimer, the term of this patent is extended or adjusted under 35 U.S.C. 154(b) by 916 days.

(21) Appl. No.: 11/541,171

(22) Filed: Sep. 30, 2006

(65) Prior Publication Data  
US 2008/0155359 A1 Jun. 26, 2008

(51) Int. Cl.  
*G06F 11/00* (2006.01)

(52) U.S. Cl. .......................................................... 714/55

(58) Field of Classification Search .................... None  
See application file for complete search history.

(56) References Cited

U.S. PATENT DOCUMENTS

| | | | |
|---|---|---|---|
| 4,580,232 A * | 4/1986 | Dugan et al. .................... 399/77 |
| 4,757,442 A * | 7/1988 | Sakata ............................. 714/11 |
| 4,803,682 A | 2/1989 | Hara et al. | |
| 4,881,227 A | 11/1989 | Buhren | |
| 4,882,669 A | 11/1989 | Miura et al. | |
| 5,297,261 A | 3/1994 | Kuranaga | |
| 5,581,549 A * | 12/1996 | Mochinaga ................... 370/216 |
| 5,636,341 A * | 6/1997 | Matsushita et al. ............. 714/13 |
| 5,724,599 A * | 3/1998 | Balmer et al. .................. 712/43 |
| 6,694,191 B2 | 2/2004 | Starkweather et al. | |
| 7,146,515 B2 * | 12/2006 | Harrington et al. ........... 713/324 |
| 2003/0236972 A1* | 12/2003 | Harrington et al. ............... 713/2 |
| 2004/0098475 A1 | 5/2004 | Zeitler et al. | |
| 2005/0081115 A1* | 4/2005 | Cheng et al. .................... 714/47 |
| 2005/0114463 A1 | 5/2005 | Lee | |
| 2006/0277321 A1* | 12/2006 | Arsenault et al. ............. 709/244 |

FOREIGN PATENT DOCUMENTS  
WO  WO/9859288  12/1998

* cited by examiner

*Primary Examiner* — Nadeem Iqbal  
(74) *Attorney, Agent, or Firm* — Cheryl F. Cohen, LLC

(57) ABSTRACT

Automatic resetting of a group of multiple processors in an electronic device wherein the processors are arranged in either a cascade chain or master-slave configuration. Upon the receipt of an originating reset signal by any one of the multiple processors the remaining processors are reset upon receipt of a forced reset signal generated by one of the processors in the group. The system states prior to the originating reset of each processor is refreshed to ensure compatible synchronization of system states and thus proper communication among the processors.

20 Claims, 10 Drawing Sheets

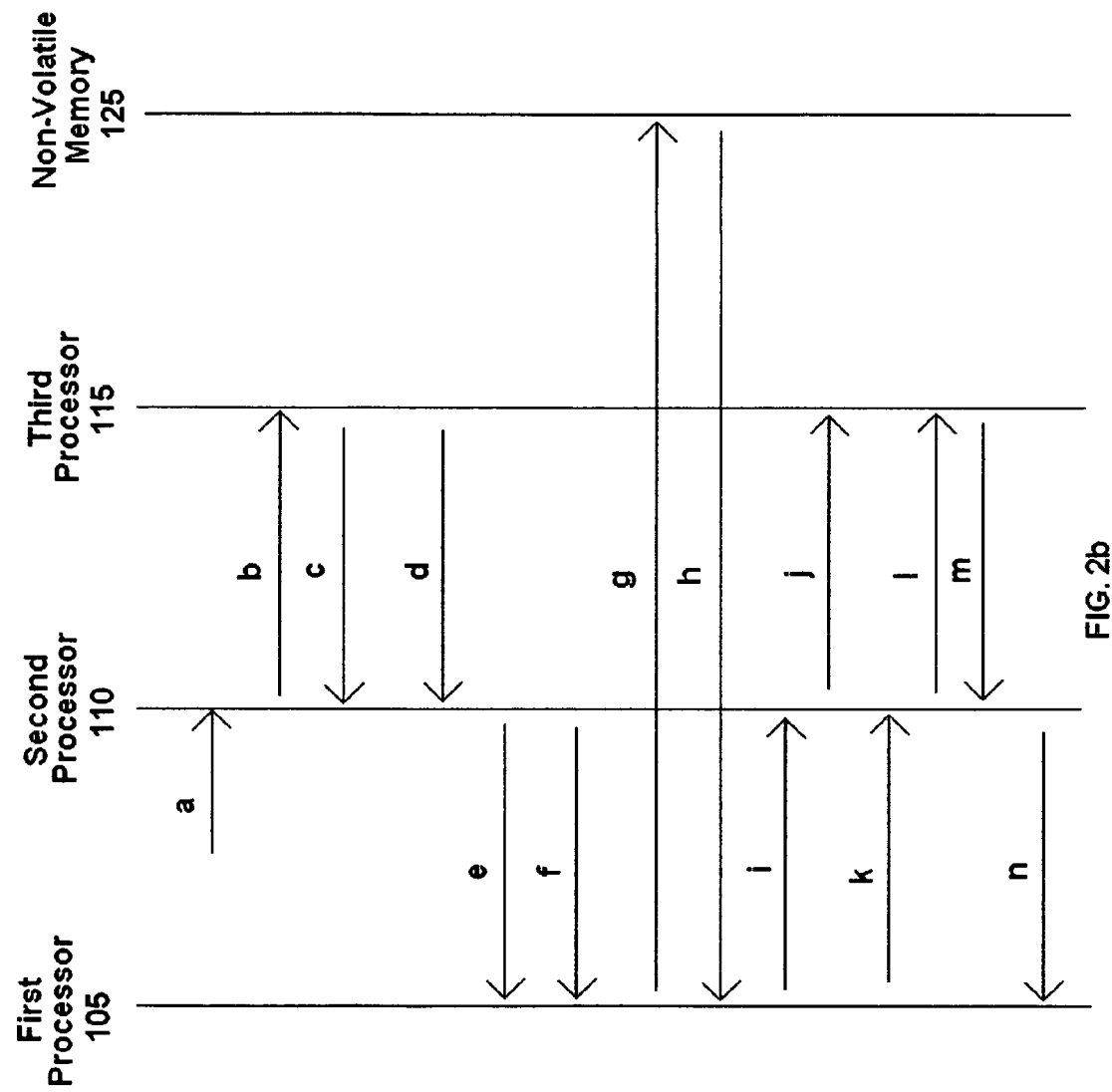

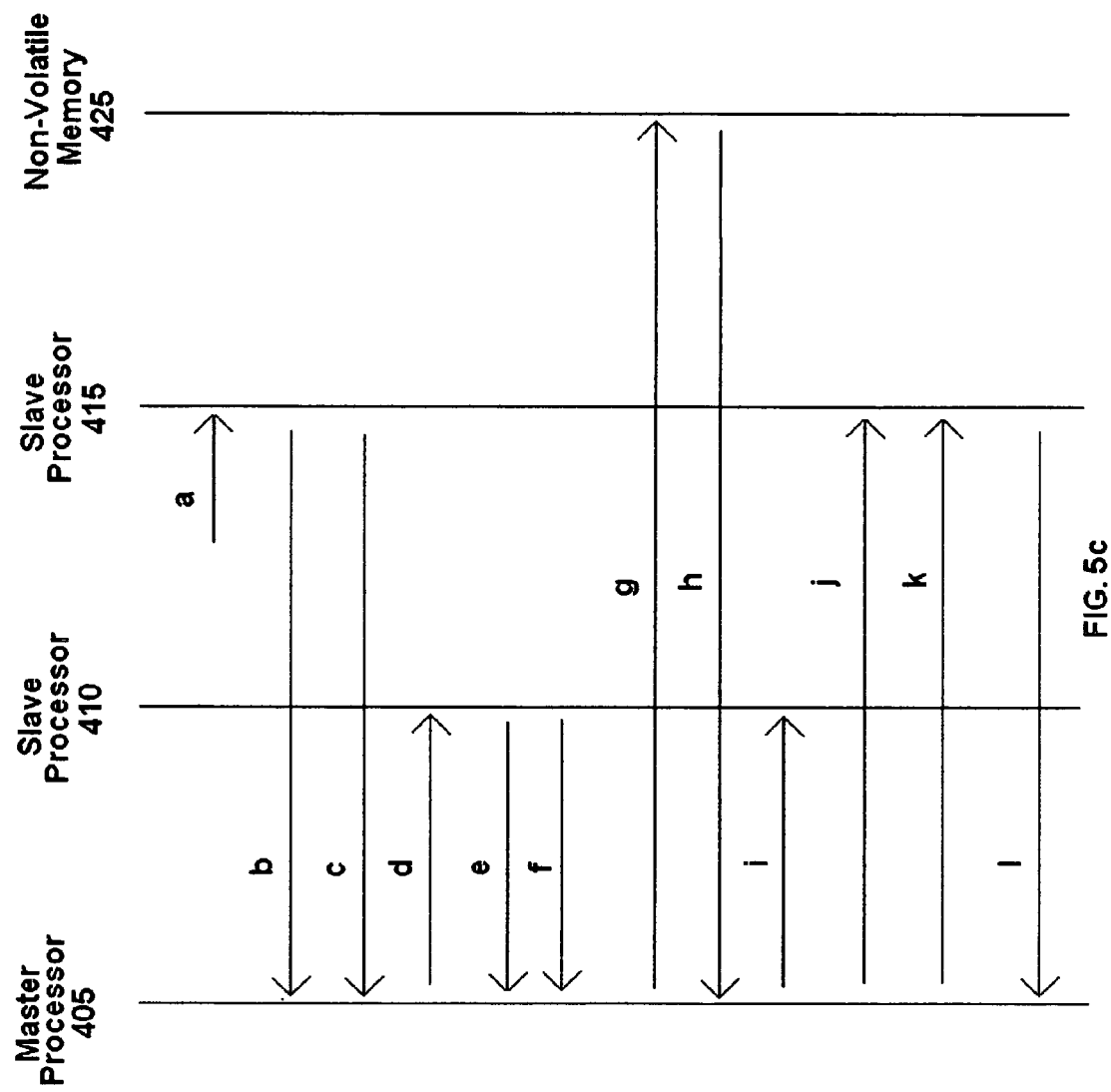

RESETTING OF MULTIPLE PROCESSORS IN AN ELECTRONIC DEVICE

BACKGROUND OF THE INVENTION

1. Field of the Invention

The present invention is directed to reset of a processor and, in particular, to multiple processors or controllers configured to ensure that an originating reset invoked in any one of the processors automatically triggers a forced reset in the remaining processors while maintaining the system state of the processors prior to the originating reset.

2. Description of Related Art

An electronic component such as a processor or controller may be reset for different reasons. For instance, the processor or controller may be reset initially upon activation. Processors or controllers are also subject to potential malfunction or defect, for example, due to a programming error in the software. A watchdog timer or some other type of error detection circuit is conventionally used as a safety device to confirm that the processor or controller is properly executing the software. The watchdog circuit which may be either external to or built into a processor resets the software when it determines that the system is not operating properly due to an electrical or programming error.

Software error detecting circuits such as watchdog circuits or timers are widely used. By way of example, U.S. Pat. No. 6,694,191 discloses an implanted medical device and hand-held communication device in which the implantable medical device is capable of operating under control of different software programs. The medical device includes a main processor and a monitor processor. Each processor has an associated error detecting circuit. An error condition detected in one processor results in the resetting of that processor as well as triggering of an error condition in the other processor that will cause it to reset. When one of the processors is reset due to detection of an error, the other processor will sooner or later unless tripped by a different error first, detect an error related to an inter-processor communication failure that will cause it to reset as well.

Another resetting system is described in U.S. Pat. No. 4,803,682 wherein the system employs a main CPU and slave CPUs. In the patented resetting system, a breakdown detection circuit (watchdog timer) is provided only with the main microcomputer. The main CPU is designed to detect an error in the slave CPUs through communication therewith thereby eliminating the need for error detection in connection with each of the slave CPUs. In response to the detection of an error the main CPU introduces a reset signal to the slave CPUs. The main CPU generates strobe signals at a predetermined cycle. A watchdog timer connected to the main CPU outputs an error signal that resets the main CPU when the strobe signals are not generated. A control means introduces a reset signal into the slave CPUs on the basis of the generation of the error signal.

The patented systems discussed above are all limited to resetting of the processor based on the detection of an error thereby failing to recognize the need for resetting of the multiple processors with other sources of reset. Furthermore, the prior art of record does not address the need to restore operation of the processors to their respective system states prior to reset and the need to ensure synchronization of system states among the processors to allow proper communication therebetween.

It is therefore desirable to develop a reset design configuration for systems employing multiple processors or controllers so that an originating reset with respect to any one of the processors or controllers automatically invokes forced resetting of all remaining processors or controllers while also refreshing the system states of the respective processors to that prior to the originating reset.

SUMMARY OF THE INVENTION

An object of the invention is to provide a reset design configuration for systems employing multiple processors whereby an originating reset triggered in any one processor will automatically invoke a forced reset of the remaining processors. This is achieved by configuring the processors in either a cascade or a master-slave arrangement.

Another aspect of the invention is to restore or refresh the system state of each processor after being rebooted to that prior to the originating reset.

The invention is directed to a system and method for automatic resetting of a group of multiple processors in an electronic device wherein the processors are arranged in either a cascade chain or master-slave configuration. Upon the receipt of an originating reset signal by any one of the multiple processors the remaining processors are reset upon receipt of a forced reset signal generated by one of the processors in the group. The system states prior to the originating reset of each processor is refreshed to ensure compatible synchronization of system states and thus proper communication among the processors.

Furthermore, the invention relates to a device including multiple processors forming a group. One processor in the group is rebooted upon receiving an originating reset signal. The remaining processors in the group are each rebooted upon receiving a forced reset signal from at least one of the multiple processors.

Still another aspect of the present invention is directed to a method for automatically resetting of all processors in an electronic device including multiple processors configured in a cascade chain including a first processor and a last processor. Starting with the processor that receives an originating reset signal, each processor automatically transmits a forced reset signal to the next processor downstream in the chain. Upon the last processor in the chain receiving a forced reset signal, starting with the last processor, each processor transmits a pair of signals to the previous processor upstream in the chain until the first processor receives the pair of signals. The pair of signals includes a forced reset signal and a bypass signal.

Yet another embodiment of the present invention is directed to a method for automatically resetting of all processors in an electronic device having multiple processors including one master processor and at least one slave processor. A forced reset signal generated by the master processor is transmitted to each slave processor that has not received an originating reset signal. Thereafter, a pair of signals from each slave processor is transmitted to the master processor, wherein the pair of signals includes a forced reset signal and a bypass signal.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which:

FIG. 2b depicts the transmission of hardware reset signaling and data communication between the processors arranged in the cascade circuitry configuration of FIG. 1, wherein an originating reset signal is received by the second processor;

FIG. 5c depicts the transmission of hardware reset signaling and data communication between the processors arranged in the master-slave circuitry configuration of FIG. 4, wherein an originating reset signal is received by the third processor.

DETAILED DESCRIPTION OF THE INVENTION

Figure 1:
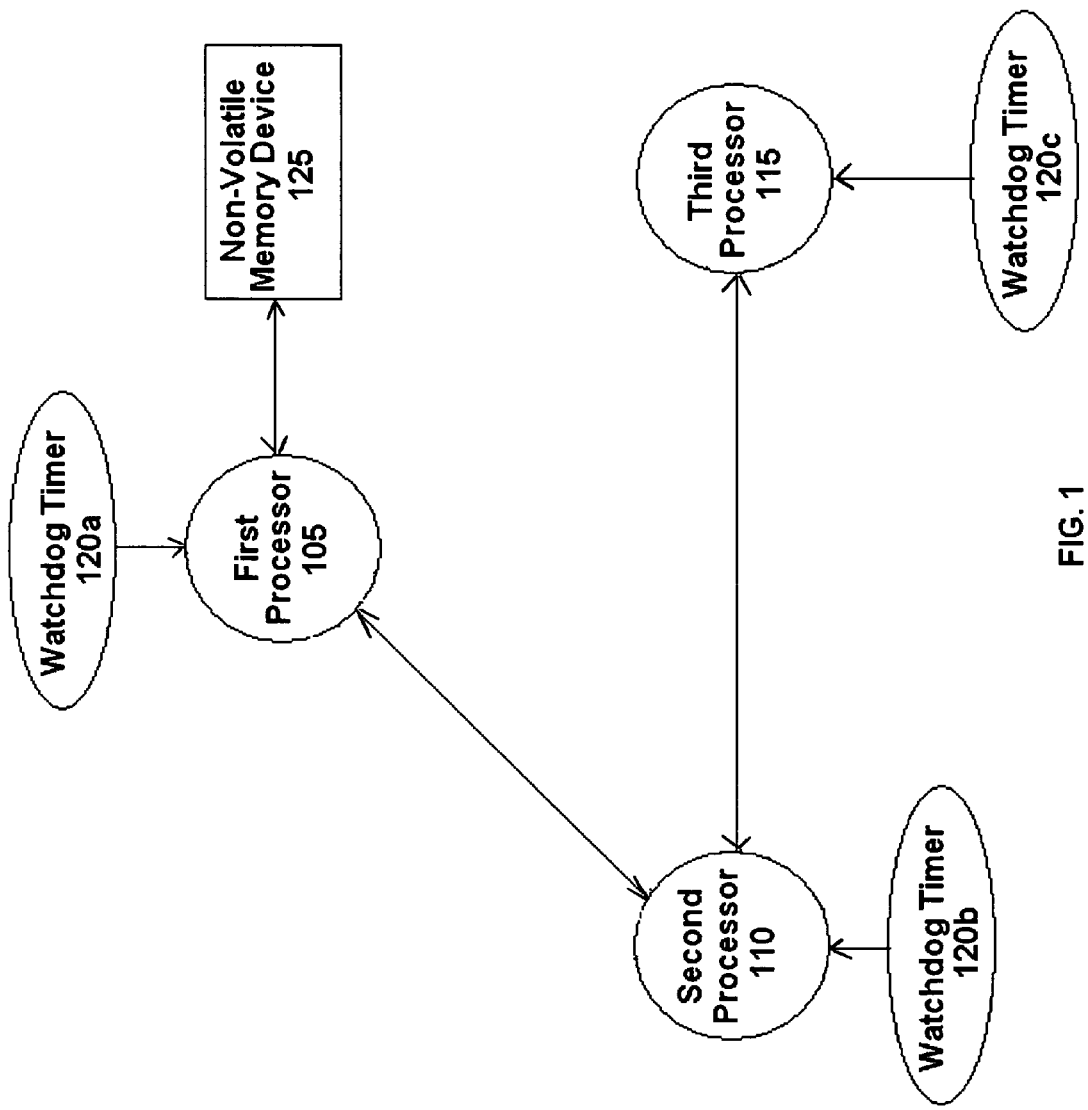
FIG. 1 is a schematic diagram of an exemplary reset cascade circuitry arrangement of three processors in accordance with the present invention.

The present inventive reset configurations are suitable for use with any electronic device or system employing multiple processors or controllers. In the figures and accompanying description the electronic device, for example, an implantable medical device, includes three processors. Although only three processors are depicted in the figures the invention may be modified, as desired, to include any number of two or more processors. Each processor may be reset based on either an originating reset or a forced reset. In a group comprising multiple processors, a single processor will reboot triggered by an originating reset but a forced reset may be the source of reboot for multiple processors. A forced reset is triggered by one processor to another in the group via a forced reset signal. On the other hand, an originating reset is the first or initial reset signal received by a processor in the group comprising multiple processors.

Processors like any electronic component are subject to possible errors or malfunctioning in the execution of their programming software. Therefore, each processor or controller preferably includes error detection circuitry such as a watchdog circuit or timer to ensure proper operation. Alternatively, a single error detection circuit may be used for monitoring proper operation of more than one processor. Upon the detection of an error condition or improper operation of any of the individual processors, its associated watchdog timer circuit generates a watchdog timer reset signal as an originating reset signal. Aside from possible reset by its own watchdog timer circuit, an originating reset signal may be generated by other sources. For instance, in the case of an implantable drug infusion pump a processor may receive an originating reset signal from an external control device or some other source attempting to establish communication with the implant device.

A processor executes programming code associated with one or more states for performing different functions. For example, a processor employed in an implantable drug infusion pump may be programmed to operate in one or more of the following exemplary states: (i) a drug dispensing state; (ii) an end-of-life state in which the power source has expired; (iii) a sterilization state; (iv) an RF communication state in which data is transmitted to or received from the control device; or (v) a self-test state to ensure the proper operation of one or more of the pump's electronic components. Communication among the processors requires synchronization of system states. Despite the rebooting of one of the processors, unless simultaneously reset, the remaining processors will continue running their software code resulting in potentially improper synchronization of the system states among the processors so as to prohibit communication therebetween. When an originating reset is triggered with respect to one of the processors proper communication is realized in accordance with the present invention by forcing synchronization of compatible system states among the remaining processors. Accordingly, the present invention is designed so that regardless of which one of the processors in the group receives the originating reset the forced rebooting of all other processors is ensured and the system state of all processors is restored to that prior to the originating reset.

In accordance with the present invention, multiple processors or controllers may be arranged in one of two configurations, for example, a cascade configuration or a master-slave configuration. FIGS. 1, 2a, 2b, 2c depict three processors connected in a cascade or chain configuration, however, the concepts described and shown herein may be adapted to any number of multiple processors, as desired. Every chain includes a first processor and a last processor. One or more processors may be connected in a cascade arrangement between the first and last processors, as desired, depending on the number of processors in the chain.

As depicted in the exemplary cascade or chain embodiment in FIG. 1, a second processor 110 is connected between the first processor 105 and the third (last) processor 115. At least one processor (the first processor 105 in the example shown in FIG. 1) is in communication with an external non-volatile memory device 125. Changes in system state of each of the processors is automatically updated or refreshed in the non-volatile memory device 125. Accordingly, the stored system state of the processors prior to an originating reset may be retrieved from the non-volatile memory. The stored system states in the non-volatile memory device 125 include such data as internal flags and variables of each of the processors. As an alternative to a single memory device shown in FIG. 1, each processor may have its own associated non-volatile memory device for storing the state of one other processor in the chain, for example, processor n stores in its associated non-volatile memory device the state of the (n+1) processor in the chain. Yet another contemplated modification is to redundantly store the system states in multiple memory devices in case a memory device associated with any one of the processors is corrupted the data may still be retrieved from the external memory device.

Figure 2A:
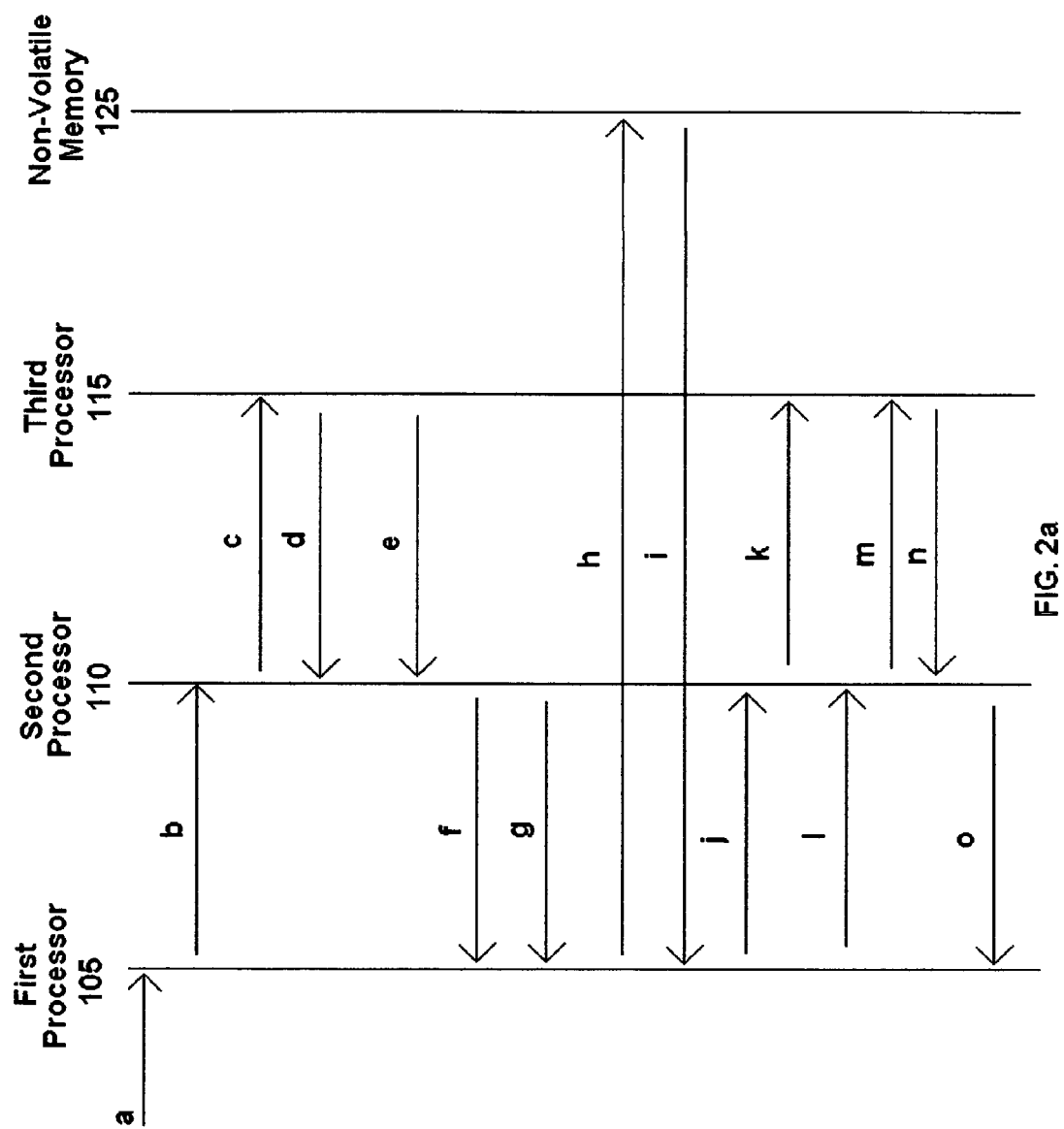
FIG. 2a depicts the transmission of hardware reset signaling and data communication between the processors arranged in the cascade circuitry configuration of FIG. 1, wherein an originating reset signal is received by the first processor.

Referring to FIG. 2a, a first scenario is depicted wherein an originating reset signal "a" such as its own watchdog timer reset signal from watchdog timer 120a is received by the first processor 105. Changes in system states of the processors are updated or refreshed in the non-volatile memory 125.

Accordingly, the system state of all processors prior to originating reset signal "a" is maintained in the non-volatile memory device 125. The originating reset signal "a" may be triggered by any number of sources including the first processor's own watchdog circuit 120a in response to the detection of a software programming error. In response to the originating reset signal "a", first processor 105 begins initialization. Rebooting of the first processor 105 automatically triggers a forced reset signal "b" to be transmitted from the first processor to the second processor 110 causing the second processor to reboot. The forced reset of the second processor 110, in turn, automatically triggers a forced reset of the third processor 115 via forced reset signal "c".

Figure 2C:
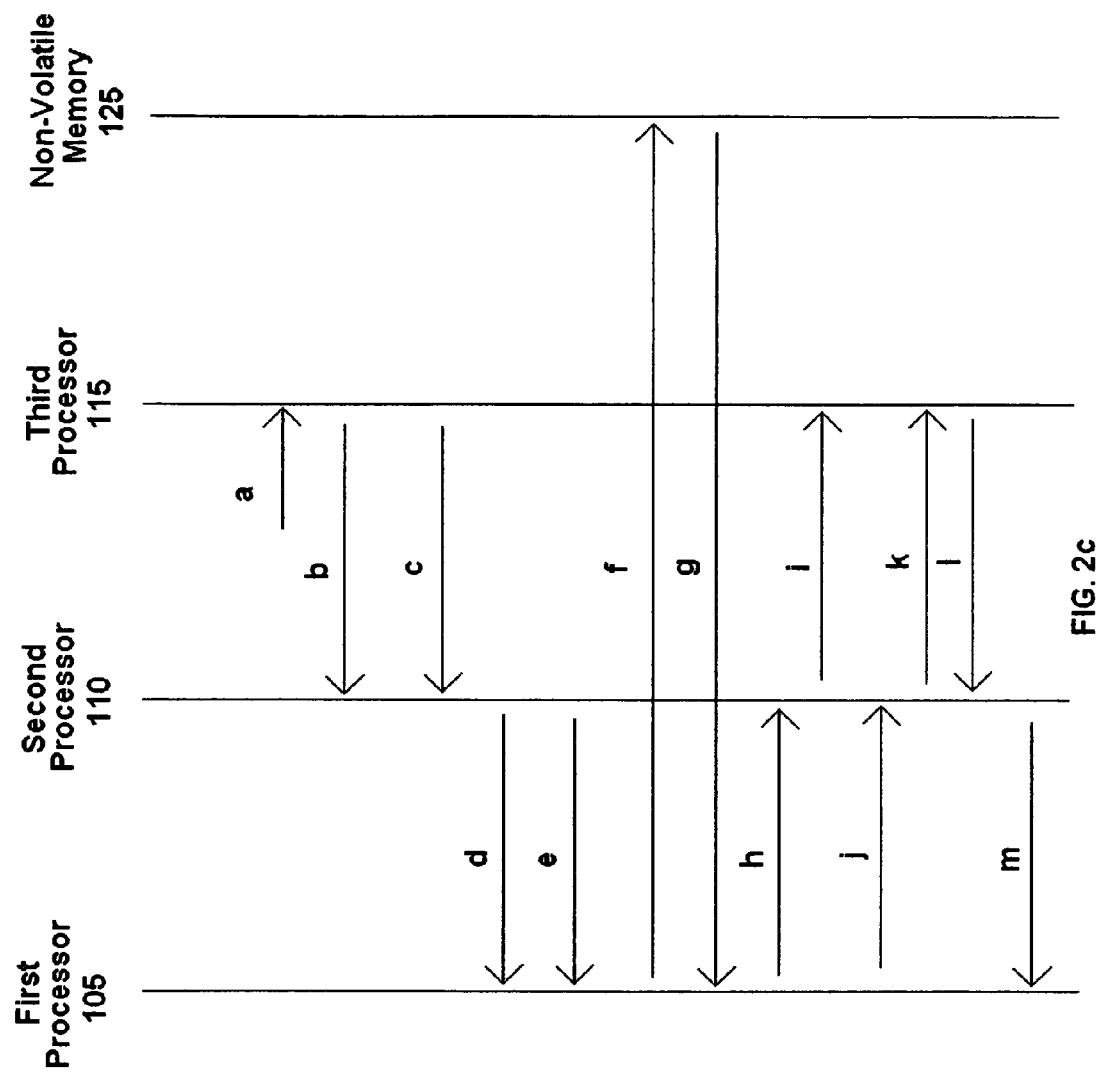
FIG. 2c depicts the transmission of hardware reset signaling and data communication between the processors arranged in the cascade circuitry configuration of FIG. 1, wherein an originating reset signal is received by the third processor.

Once the last processor in the chain, that is the third processor 115 in FIG. 2a, has been reset, starting with the last processor a series of forced reset signals is transmitted upstream through the chain from one processor to the previous processor. As previously noted, resetting of any particular processor in the chain is either an originating reset or a forced reset. The processor while executing reset programming sequencing, however, is not able to identify the specific source of its own reset. For example, the source of reset of third processor 115 may be the result of an originating reset such as the detection of a software error by its own watchdog timer circuit 120c (as shown in FIG. 2c) or a forced reset signal "c" transmitted from the second processor 110 (as shown in FIG. 2a). Since the identify of the source of reset is unknown, the third processor 115 transmits a forced reset signal "d" back to the second processor 110 to ensure synchronization of system states among the processors and proper communication therebetween. However, upon receiving the forced reset signal "d" from the third processor 115 the second processor 110 is programmed to automatically transmit a forced reset signal back to the third processor, thereby resulting in an endless or infinite loop of reset signals transmitted between the two processors. To avoid such an infinite loop, the third processor 115 informs the second processor by way of a bypass signal "e" that the source of the forced reset signal "d" is from the third processor 115 and thus subsequent forced resetting of the third processor 115 by the second processor 110 is not warranted.

In a similar manner, the second processor 110 not knowing the source of its own reset triggers a forced reset signal "f" of the first processor 105 to ensure synchronization of system states among the processors. Again a bypass signal "g" is sent from the second processor 110 to the first processor 105 to inform the first processor that it has been reset by the second processor so as to avoid redundant resetting of the second processor.

At this point in time all three processors in the chain have been reset either by an originating reset signal and/or a forced reset signal from another processor. Reset programming clears from memory data stored therein including the system state of each of the processors such as its internal data flags and variables. It is desirable to recover the system states of each of the processors to that prior to the originating reset so that the processors may resume from where operations left off. The system state of all processors prior to the originating reset is stored in the non-volatile memory device 125. In the example shown in FIG. 2a, a signal "h" is transmitted from the first processor 105 to the non-volatile memory device 125 and the retrieved system states of each of the processors is transmitted back as a data signal "i". The system state data retrieved from the non-volatile memory device 125 is then communicated by way of signal "j" from the first processor 105 to the second processor 110, and subsequently thereto as data signal "k" from the second processor 110 to the third processor 115 to be adopted by the respective processors. Each processor is once again refreshed with its respective system state prior to the occurrence of the originating reset signal "a". As mentioned above, if in an alternative configuration each processor has its own associated non-volatile memory device, then the retrieving and refreshing of the systems states of each processor would be altered accordingly. In addition, the system states may be retrieved from the non-volatile memory device 125 from some processor other than the first processor in chain.

It is possible that different instructions to be performed by one or more processors following reset depending on the source of reset of another processor in the chain. In the example shown in FIGS. 2a-2c, different instructions may be selected to be performed by the first processor 105 depending on the source of reset of the third processor 115. Accordingly, the first processor 105 inquires as to the origin or source of reset of the third processor 115. Such inquiry is accomplished in FIG. 2a by transmitting a signal "l" from the first processor 105 to the second processor 110, followed by signal "m" from the second processor 110 to the third processor 115. Based on the identified origin of reset of the third processor 115, a series of instruction signals (signals "n" and "o") are transmitted upstream in the chain from one processor to the next until received by the first processor 105. In the examples shown in FIGS. 2a-2c, third processor 115 includes appropriate circuitry for ascertaining whether its reset was triggered by a request from an external control device to establish RF communication with the implantable medical device. FIGS. 2a & 2b depict a situation in which the third processor 115 has been reset by a forced reset signal from the second processor 110 and thus appropriate instructions, for example, self-testing operations, would be performed by the first processor 105.

The remaining two possible scenarios are depicted in FIGS. 2b and 2c, wherein the originating reset signal is received by the second processor 110 and third processor 115, respectively. A detailed description of these other scenarios is not required but may be deduced from that provided above with respect to the first scenario shown in FIG. 2a. One point of distinction, however, will be noted. In FIG. 2c, the third processor 115 is reboot based on an originating reset. One possible origin for originating reset may be based on a request from an external control device to establish RF communication with the implantable medical device. Under such circumstances, then a series of instruction signals (signals "l" and "m") are transmitted upstream in the chain from the third processor 115 to the other until received by the first processor 105 to transmit a response back to the external control device and establish RF communication. Since the basis for reset of the third processor 115 is due to an originating reset in FIG. 2c rather than a forced reset as found in FIGS. 2a & 2b, different instructions will be performed by the first processor 105 following reset in the example shown in FIG. 2c in comparison to that shown in FIG. 2a or 2b based on the reset of processor 115.

The specific instructions to be implemented by any of the processors after having been reboot depend on the functionality to be performed and may be modified as desired. Thus far, the invention has been described by way of illustration purposes only as providing different instructions to be selected and performed by the first processor 105 depending on the origin of reset of the third or last processor in the chain. It is, however, contemplated and within the intended scope of the present invention to modify the system whereby only a single set of instructions are to be performed following reset of the first processor under all circumstances thereby eliminating the need for signals inquiring as to the source of reset of the third processor altogether.

Figure 3:
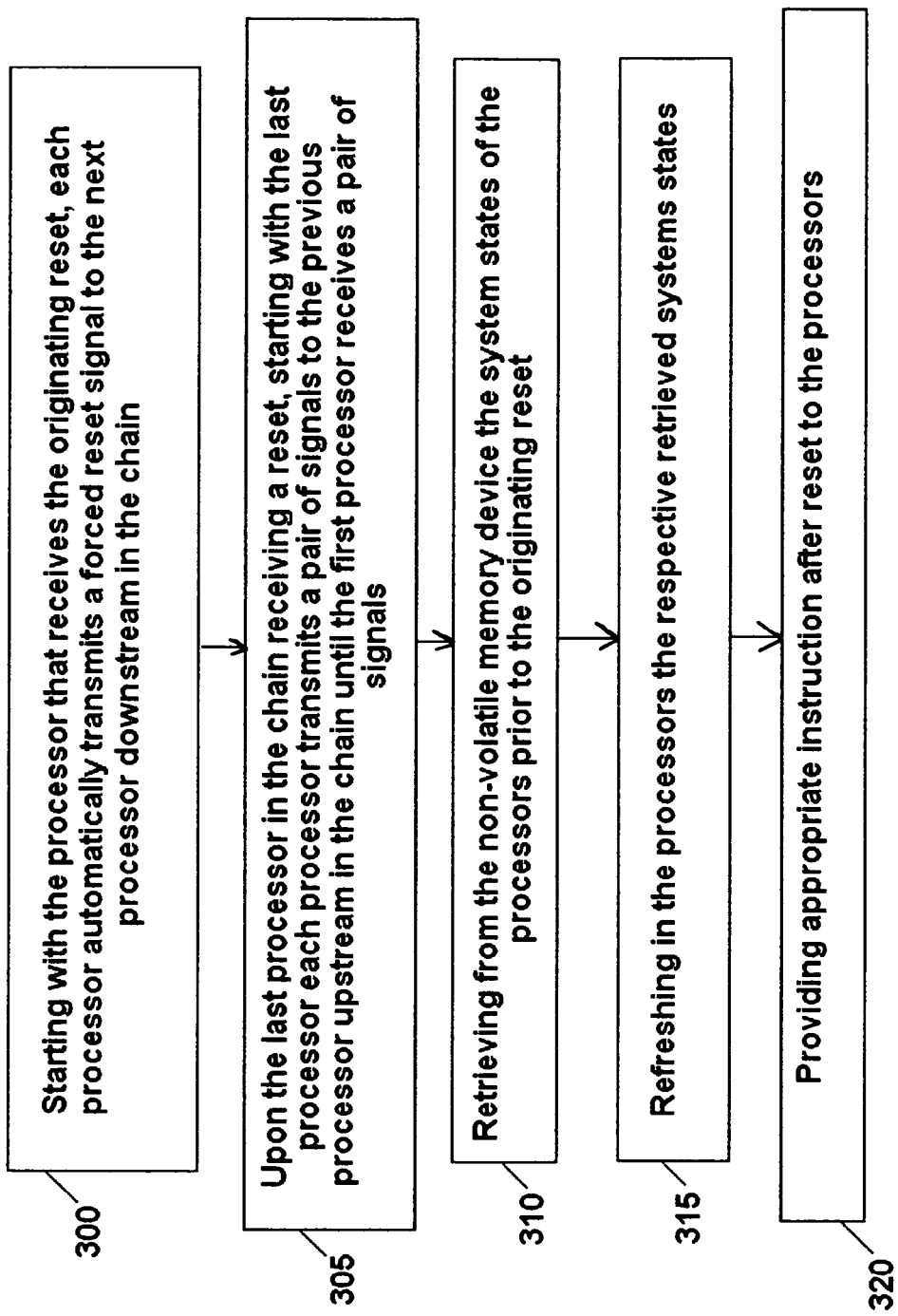
FIG. 3 is an exemplary flow chart for the automatic resetting of multiple processors arranged in a cascade or chain configuration.

The detailed description provided above with respect to FIGS. 2a, 2b, 2c was applicable for a device employing three processors in a cascade or chain configuration. Similar principles may be applied to a device with any number of three or more processors. FIG. 3 is a flow chart of the generic steps to be performed in the operation of an electronic device with multiple processors arranged in a reset cascade or chain configuration. Multiple processors are connected one to the other to form a chain including a first processor and a last processor with possibly one or more processors connected therebetween. Relative to the first processor the next processor in the chain is said to be downstream, whereas relative to the last processor all other processors are said to be upstream in the chain. In step 300, starting with the processor that receives the originating reset, each processor automatically transmits a forced reset signal to the next processor downstream in the chain. Upon the last processor in the chain receiving a reset (either an originating reset or a forced reset), in step 305 starting with the last processor each processor transmits a pair of signals to the previous processor upstream in the chain until the first processor receives a pair of signals. Each pair of signals includes a forced reset signal and a bypass signal. All processors have now been reset. Next in step 310, the system states of the processors prior to the originating reset are retrieved from the non-volatile memory device and the data distributed to the respective processors in step 315. As previously noted above, instead of a single non-volatile memory device as indicated in the flow chart of FIG. 3, a non-volatile memory device may be built in to or associated with each processor whereby the system state of each processor is retrieved from its respective memory device. In addition, FIG. 3 describes the system state as being stored only in an external memory device, however, such data may alternatively be stored in an internal built in memory of the processor. It is also possible to store such information in both an external memory device and an internal memory device for redundancy in case such data is lost during interruption of the processor. Thereafter, in step 320 instructions to be performed following reset are determined for each processor. This last step includes determining the source of reset for a particular processor in the chain and providing appropriate instructions following reset to one or more other processors based on the identified source of reset for the particular processor.

Figure 4:
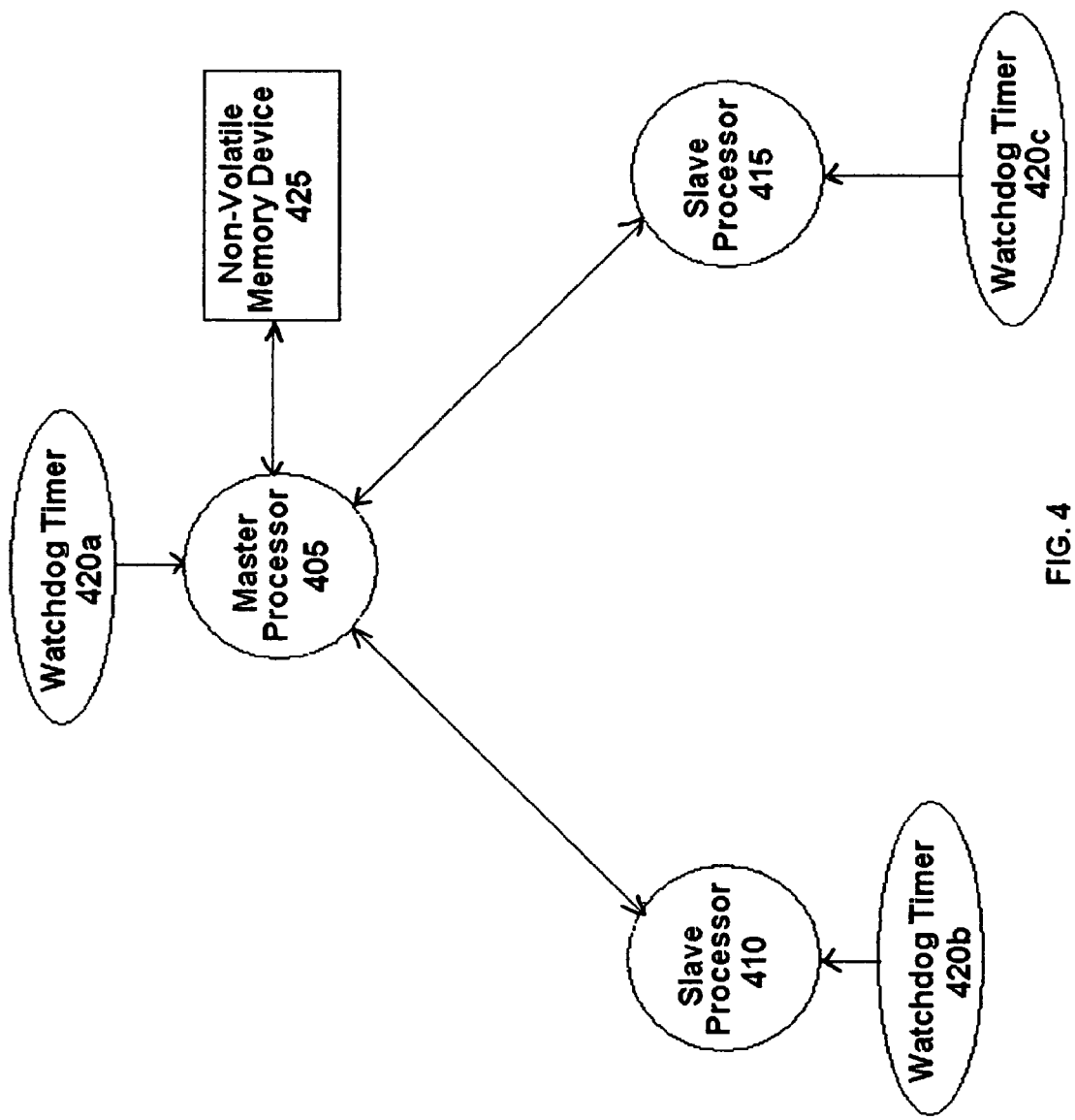
FIG. 4 is a schematic diagram of an exemplary reset master-slave circuitry configuration of three processors in accordance with the present invention.

As an alternative configuration to that of the cascade or chain arrangement, multiple processors may be arranged in a master-slave arrangement including one master/main processor 405 and one or more slave processors 410, 415 such as the example depicted in FIG. 4. Each processor preferably has an associated watchdog timer circuit 420a, 420b, 420c, respectively, associated therewith for detection of software programming errors. A representation of the hardware reset and data signals communicated between the processors is shown in FIGS. 5a, 5b, 5c depicting the different scenarios in which the originating signal is received by each of the three processors, respectively, of FIG. 4.

Figure 5A:
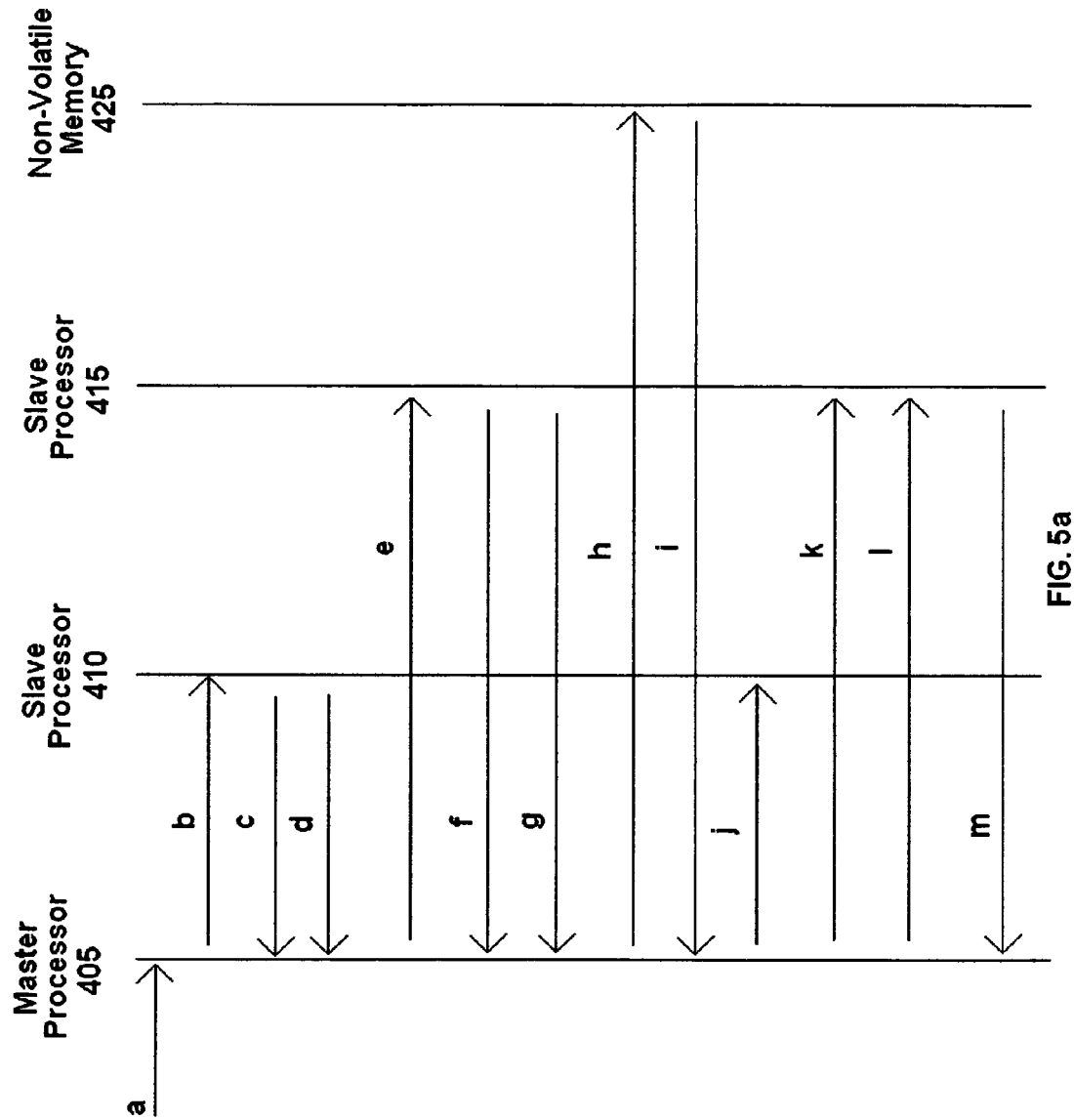
FIG. 5a depicts the transmission of hardware reset signaling and data communication between the processors arranged in the master-slave circuitry configuration of FIG. 4, wherein an originating reset signal is received by the first processor.

Referring to FIG. 5a, master processor 405 receives an originating reset signal "a" and automatically triggers a forced reset signal "b" to be transmitted to slave processor 410. In response, slave processor 410 transmits back to master processor 405 a pair of signals including a forced reset signal "c" and a bypass signal "d". The receipt by the master processor 405 of the bypass signal "d" prevents the automatic transmission of a forced reset signal back to slave processor 410 that would otherwise result in an endless or infinite loop. A second forced reset signal "e" is transmitted from the master processor 405 to the other slave processor 415. In turn, slave processor 415 sends a pair of signals including a forced reset signal "f" and a bypass signal "g" back to the master processor 405. Now all processors have been reset either by originating reset and/or forced reset. The rebooting of all processors clears or deletes all data stored in their respective internal memories. Data concerning the system states of all processors prior to the originating reset is retrieved from the non-volatile memory device 425 in response to a request signal "h" from the master processor 405. The system state data retrieved from the non-volatile memory device as signal "i" is then distributed via signals "j" and "k" to the respective processors to refresh or update their associated memories.

Now that all processors have been reset and their system state refreshed to that which it was prior to the occurrence of the originating reset, instructions are provided for operation of each of the processors. Once again, it is possible that different instructions to be performed by one or more processors following reset may be selected based upon the source of reset of another processor.

Figure 5B:
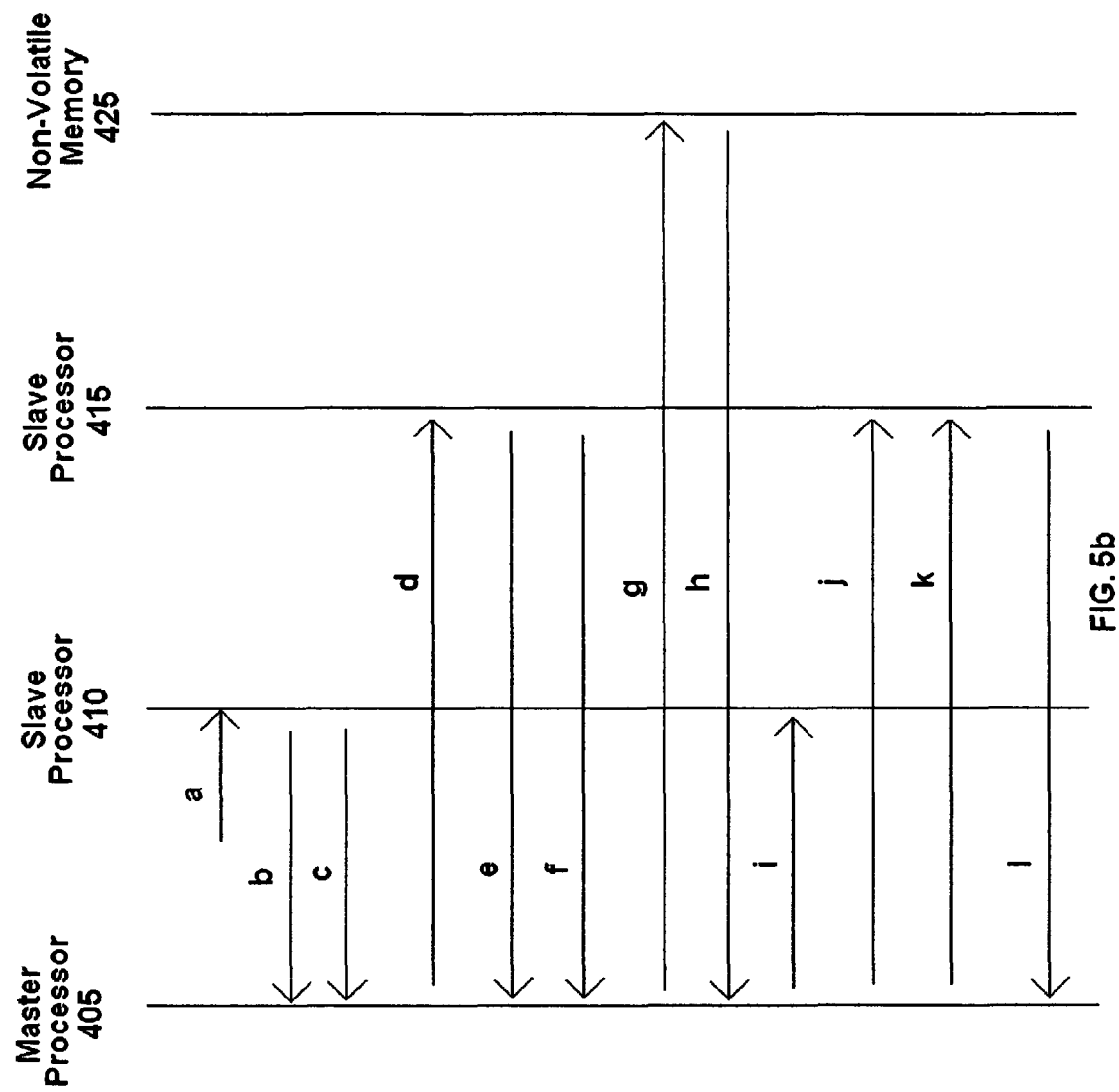
FIG. 5b depicts the transmission of hardware reset signaling and data communication between the processors arranged in the master-slave circuitry configuration of FIG. 4, wherein an originating reset signal is received by the second processor.

In the examples shown in FIGS. 5a-5c, different instructions may be selected to be performed by the master processor 405 following reset depending on the origin of reset of the slave processor 415. Accordingly, in FIG. 5a signal "l" is transmitted from the master processor 405 to the slave processor 415 to inquire as to the origin or source of its own reset. To realize this functionality, in the illustrative embodiment shown in FIG. 5a, slave processor 415 includes appropriate circuitry for ascertaining whether its reset was triggered by a request from an external control unit to establish RF communication with the implantable medical device.

An appropriate instruction signal "m" is transmitted to the master processor 405 from slave processor 415 based on its detected origin of reset. In the examples shown in FIG. 5a, since the slave processor 415 has been reset by a forced reset signal "e" from the master processor 405 an appropriate instruction signal, for example, self-testing operations, would be generated by slave processor 415 and performed by master processor 405.

The other two possible scenarios in which the originating reset signal is received by slave processor 410 or 415 are represented in FIGS. 5b and 5c, respectively. A detailed description of these other situations is not warranted but instead may be gained from referring to the description provided above with respect to the example shown in FIG. 5a. One point of distinction between the exemplary embodiments of FIGS. 5a-5c, however, lies with the instructions to be performed by the master processor 405 following reset. In the embodiment depicted in FIG. 5c, since the slave processor 415 is reboot due to an originating reset based on a request from an external control device to establish RF communication with the implantable medical device. Under such circumstances, then an instruction signal "l" is transmitted upstream in the chain from the slave processor 415 to the master processor 405 to initiate RF communication with the external control device. The origin or source of reset of slave processor 415 will result in the instruction signal "l" in FIG. 5c to differ from the instruction signal "m" in FIG. 5a or "l" in FIG. 5b.

The specific instructions to be implemented by any of the processors after having been reboot depend on the functionality to be performed and may be modified as desired. Thus far, the invention has been described as providing different instructions to be selected and performed by the master processor 405 depending on the origin of reset of slave processor 415. It is, however, contemplated and within the intended scope of the present invention to modify the system whereby only a single set of instructions are to be performed following reset under all circumstances thereby eliminating altogether to select or determine which from plural instruction signals to implement based on the origin of reset.

Figure 6:
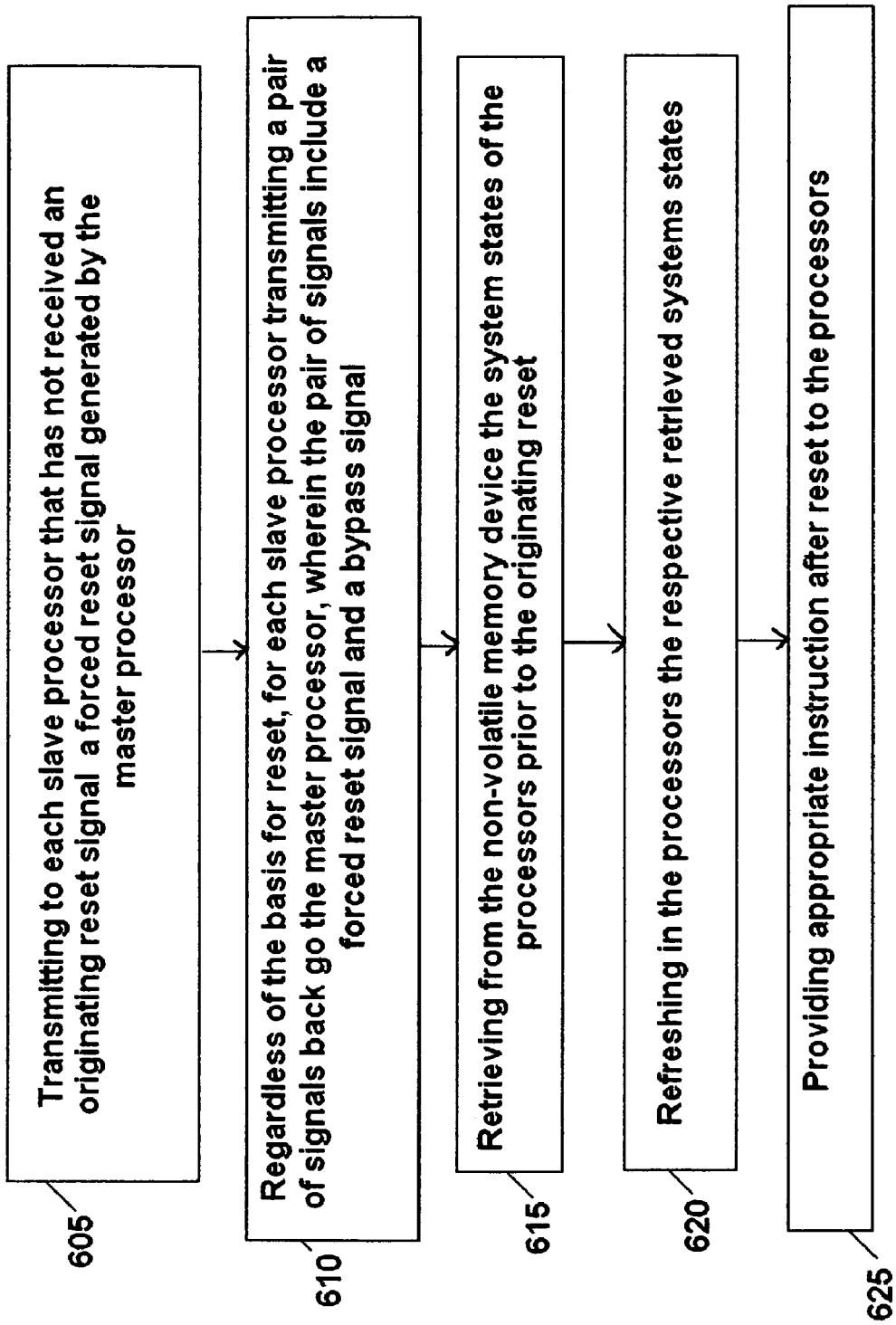
FIG. 6 is an exemplary flow chart for the automatic resetting of multiple processors arranged in a master-slave configuration.

The description above of the operation of the three processors arranged in a master-slave configuration may be applied to a system or device having any number of multiple processors. FIG. 6 represents a flow chart of the operation for reset of multiple processors arranged in a master-slave configuration. In step 605, each slave processor that has not received an originating reset signal is reset by a forced reset signal transmitted from the master processor. Each slave processor, regardless of the basis for reset (originating or forced reset), transmits a pair of signals back to the master processor in step 610, wherein the pair includes a forced reset signal and a bypass signal. Then in step 615, data concerning the system states of the processors prior to the originating reset is retrieved from a non-volatile memory device. The system states of the respective processors is refreshed, in step 620, based on information retrieved from a non-volatile memory device. Lastly, in accordance with step 625, instructions to be performed following reset are provided for each of the processors.

The exemplary embodiments shown and described above are for illustration purposes only. It is contemplated and within the intended scope of the invention to modify the present invention for use with any number of multiple processors arranged in either a cascade or master-slave configuration. Furthermore, the use of an external memory device, an internal memory device, or both to store system states of the processors may be employed. Lastly, the instruction signals described in the embodiments above are by way of illustration only and multiple sets of instructions signals to be performed by a processor following reset may be modified, as desired, to be dependent on the basis of reset of any one or more of the other processors in the group. If the instructions to be performed by a processor following reset are the same irrespective of the source or origin of reset of any of the other processors then such inquiry can be eliminated altogether.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A device comprising:
multiple processors forming a group, one processor in the group being reboot upon receiving an originating reset signal and the remaining processors in the group each being reboot upon receiving an automatically invoked forced reset signal from at least one of the multiple processors, wherein the one processor in the group that receives the originating reset signal also receives a bypass signal along with the forced reset signal from at least one of the other multiple processors in the group.

2. The device in accordance with claim 1, wherein the multiple processors are connected in a cascade chain to include a first processor and a last processor.

3. The device in accordance with claim 2, wherein each of the multiple processors includes circuitry for transmitting the forced reset signal from one processor in the chain to only one other processor in the chain upon receiving an originating reset signal or a forced reset signal.

4. The device in accordance with claim 1, wherein the plural processors include one master processor and at least one slave processor.

5. The device in accordance with claim 4, wherein the master processor includes circuitry for transmitting the forced reset signal to each slave processor in the group that does not receive the originating reset signal, and each slave processor includes circuitry for transmitting the forced reset signal to the master processor.

6. The device in accordance with claim 1, wherein the device includes at least three processors.

7. The device in accordance with claim 1, wherein each of the multiple processors includes an associated watchdog circuit for detecting an error condition and circuitry for generating an originating reset signal upon the detection of the error condition.

8. The device in accordance with claim 1, further comprising a non-volatile memory device for storing systems states of each of the multiple processors prior to the originating reset signal, the multiple processors being refreshed by the stored system states to that prior to the originating reset signal to achieve synchronization of compatible system states among the multiple processors.

9. The device in accordance with claim 1, further comprising multiple non-volatile memory devices, one associated with each of the multiple processors, each of the non-volatile memory devices storing a system state of another processor in the group prior to the originating reset signal, the system state of each of the multiple processors in the group being refreshed by the stored system states to that prior to the originating reset signal to achieve synchronization of compatible system states among the multiple processors.

10. The device in accordance with claim 1, wherein the originating reset signal is triggered in response to one of multiple sources of reset including detection of an error signal.

11. A method for automatically resetting of all processors in an electronic device including multiple processors configured in a cascade chain including a first processor and a last processor, comprising the steps of:
starting with the processor that receives an originating reset signal, each processor automatically transmitting a forced reset signal to the next processor downstream in the chain; and
upon the last processor in the chain receiving a forced reset signal, starting with the last processor, each processor transmitting a pair of signals to the previous processor upstream in the chain until the first processor receives the pair of signals, the pair of signals including a forced reset signal and a bypass signal.

12. The method in accordance with claim 11, further comprising the steps of:
retrieving from a non-volatile memory device stored system states of the processors prior to the originating reset signal; and refreshing in each of the multiple processors the respective retrieved system states to ensure synchronization of compatible system states among the multiple processors.

13. The method in accordance with claim 12, further comprising the step of providing an appropriate instruction after reset to at least one processor based on an origin of reset of another processor in the chain.

14. The method in accordance with claim 13, wherein the instruction provided to the first processor in the chain is based on the origin of reset of the last processor in the chain.

15. The method in accordance with claim 13, wherein the originating reset signal is triggered in response to one of multiple sources of reset including detection of an error signal.

16. A method for automatically resetting of all processors in an electronic device including multiple processors including one master processor and at least one slave processor, comprising the steps of:

transmitting to each slave processor that has not received an originating reset signal a forced reset signal generated by the master processor; and transmitting a pair of signals from each slave processor to the master processor, the pair of signals including a forced reset signal and a bypass signal.

17. The method in accordance with claim 16, further comprising the step of:

retrieving from a non-volatile memory device system states of each of the multiple processors prior to the originating reset; and refreshing in each of the multiple processors the retrieved system states to ensure synchronization of compatible system states among the multiple processors.

18. The method in accordance with claim 16, further comprising the step of providing appropriate instruction after reset to at least one processor based on an origin of reset of another processor in the group.

19. The method in accordance with claim 18, wherein the instructions are provided to the master processor based on the origin of reset of one of the slave processors.

20. The method in accordance with claim 16, wherein the originating reset signal is triggered in response to one of multiple sources of reset including detection of an error signal.

* * * * *